United States Patent
Keithley

(10) Patent No.: US 8,046,518 B1
(45) Date of Patent: Oct. 25, 2011

(54) USB ISOCHRONOUS DATA TRANSFER FOR A HOST BASED LASER PRINTER

(75) Inventor: Douglas G. Keithley, Boise, ID (US)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 12/727,088

(22) Filed: Mar. 18, 2010

Related U.S. Application Data

(63) Continuation of application No. 11/803,115, filed on May 11, 2007, now Pat. No. 7,707,349.

(60) Provisional application No. 60/816,539, filed on Jun. 26, 2006.

(51) Int. Cl.
*G06F 13/20* (2006.01)
*G06F 13/00* (2006.01)

(52) U.S. Cl. ............. 710/313; 710/62; 710/72; 358/1.1; 714/1; 714/7; 714/798; 714/15

(58) Field of Classification Search ................ 710/313, 710/1–3, 33–35, 62–65, 72; 714/1–2, 7, 714/15, 798, 799; 358/1.1
See application file for complete search history.

(56) References Cited

U.S. PATENT DOCUMENTS

| | | | |
|---|---|---|---|
| 6,151,653 | A | 11/2000 | Lin et al. |
| 6,473,811 | B1 | 10/2002 | Onsen |
| 6,754,240 | B1 | 6/2004 | Crummey et al. |
| 7,272,676 | B2 | 9/2007 | Saito et al. |
| 7,346,729 | B2 | 3/2008 | Watanabe |
| 2004/0095929 | A1 | 5/2004 | Aoshima |
| 2005/0240711 | A1 | 10/2005 | Watanabe |
| 2006/0184708 | A1 | 8/2006 | Sieeman et al. |
| 2007/0112997 | A1 | 5/2007 | Watanabe |
| 2007/0177190 | A1 | 8/2007 | Briggs et al. |
| 2008/0276037 | A1 | 11/2008 | Chang et al. |

OTHER PUBLICATIONS

U.S. Appl. No. 11/343,136, filed Jan. 30, 2006.
**PLUS Search Results for U.S. Appl. No. 11/803,115, searched Friday, Jul. 31, 2009.

*Primary Examiner* — Christopher B Shin

(57) ABSTRACT

A system, method, and processor executable instructions to isochronously communicate in standard USB mode laser printer scan data from a host computer to a laser printer. The host computer transmits a data stream that includes data packets having laser printer scan data, error detection information, and correction packets such as parity packets for use to reconstruct packets having an error. The laser printer receives the data stream, processes the error detection information, data packets and parity packets, and provides a continuous stream of laser printer scan data for printing.

20 Claims, 4 Drawing Sheets

USB ISOCHRONOUS DATA TRANSFER FOR A HOST BASED LASER PRINTER

CROSS-REFERENCE TO RELATED APPLICATION

This application is a continuation application of U.S. patent application Ser. No. 11/803,115, filed May 11, 2007, which is hereby incorporated by reference in its entirety. This application claims the benefit of U.S. Provisional Application No. 60/816,539, filed Jun. 26, 2006, which is hereby incorporated by reference in its entirety.

FIELD OF THE INVENTION

The present disclosure is related to the field of host based laser printer systems. More specifically, the present disclosure relates to using the standard USB mode of data transfer for transferring laser printer scan data from a host computer to a laser printer.

BACKGROUND

A laser printer printing process typically includes a series of steps for transferring an image from a photoreceptor to a page of paper moving through the printer. The steps include projecting an electrostatic charge from a primary charge roller onto the photoreceptor. A mirror moves in accord with laser printer scan data, such as a raster image, to direct a laser beam through a system of lenses and mirrors onto the photoreceptor surface. The photoreceptor surface containing the latent image is then exposed to toner. Next, the photoreceptor surface is pressed or rolled over paper, transferring the image onto the paper as it steadily moves through the printer. The paper then passes through a fuser assembly having rollers that provide heat and pressure to bond the toner to the paper. Finally, an electrically neutral rubber blade cleans any excess toner from the photoreceptor.

The laser printer printing steps are synchronized and the process requires that the paper continuously move through the printer. Therefore, unlike an ink-jet printing process which can be paused, if necessary, to obtain printer data, the laser printer process requires that the laser printer scan data be readily available so that it can be read at a continuous and uninterrupted pace from the start of the process until the page is complete.

Theoretically, the universal serial bus (USB) standard isochronous mode provides a rate of data transfer that is sufficient for a host based laser printer. However, the USB standard isochronous mode does not provide error correction and is therefore unsuitable for real-time transfer of laser printer scan data from a host computer to the laser printer's system of lenses and mirrors, commonly referred to as video hardware. To compensate for the lack of error correction during data transfer, current USB host based laser printer systems buffer a significant portion of a page at the printer before starting the printing process. The need to buffer a significant portion of a page places a heavy demand on laser printer memory. For example, a typical host based color laser printer buffers over 16 MB of data in the printer's RAM.

SUMMARY

There is a presently recognized need for error correction of laser printer scan data received at a laser printer in USB standard isochronous mode.

The present invention is defined by the claims and nothing in this section should be taken as a limitation on those claims.

According to a first aspect of the invention, a host computer prepares an image for printing. Laser printer scan data is prepared and broken up into data packets. The data packets are paired-up into packet member pairs and a parity packet is derived for each pair. In one version, parity packets are the result of an XOR operation on the two members of a data packet pair. The data packets and the parity packets are transmitted isochronously from a USB host port, through a USB cable, to a USB device hardware at the laser printer.

According to a second aspect of the invention, a USB host port derives a first checksum value for each data packet at the host computer by applying the laser printer scan data of each data packet to a hash function, such as a cyclic redundancy check function. The first checksum value for each data packet is transmitted from the host computer to the USB device hardware along with the data packets and the parity packets.

According to another aspect of the invention, the USB device hardware derives a second checksum value for each received data packet by applying the laser printer scan data of each received data packet to the hash function used by the USB host port. For each received data packet, the first checksum value (derived at the host computer) is compared to the second checksum value (derived at the laser printer) to determine whether the data packet has an error. In one version, if a received data packet has an error, the data packet is reconstructed by applying an XOR operation to the data packet's member pair and its parity packet. Errorless and corrected data packets are communicated to a buffer memory in communication with the laser printer video hardware. The buffer memory may be part of the USB device hardware memory, laser printer main memory, video hardware memory, or other memory device.

The preferred embodiments will now be described with reference to the attached drawings.

DETAILED DESCRIPTION OF THE PRESENTLY

Preferred Embodiments

Figure 1:
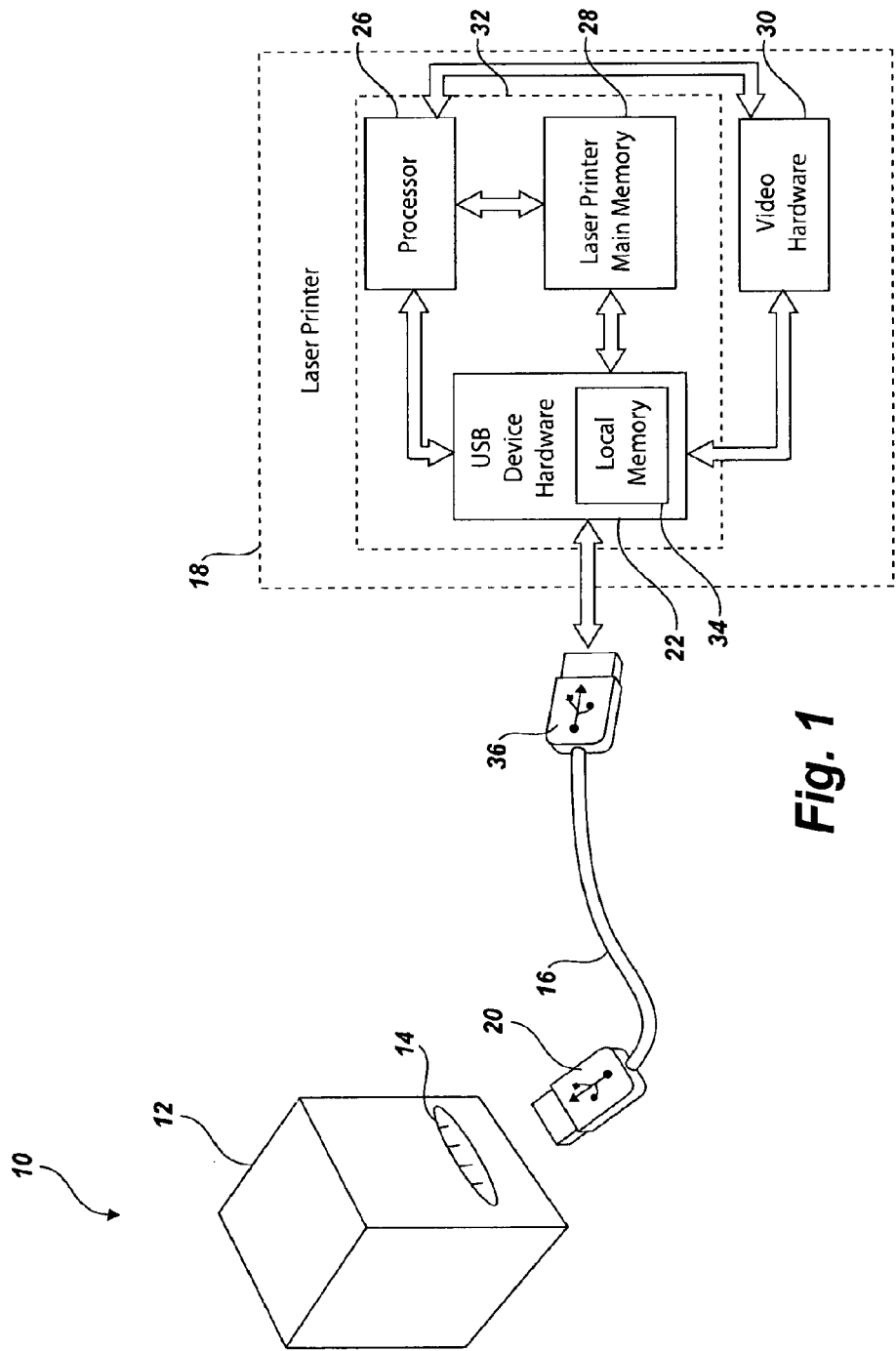
FIG. 1 is an illustration of a USB host based laser printer system of the present invention having a preferred configuration to transfer laser printer scan data from a host computer to a laser printer using the USB standard isochronous mode.

FIG. 1 shows a USB host based laser printer system 10. A host computer 12 has a host processor (not shown) in communication with a USB host port 14. A USB cable 16 has a first USB terminal 20 for connection to the USB host port 14 and a second USB terminal 36 for connection to USB device hardware 22 at a laser printer 18.

Figure 2:
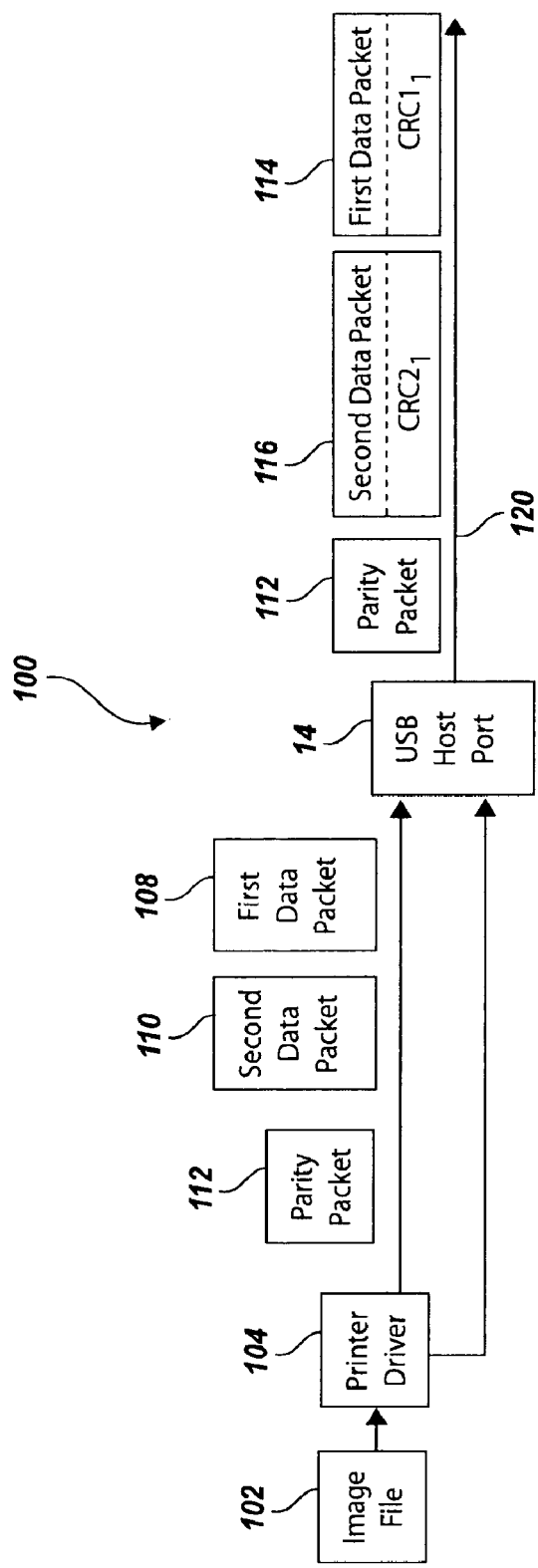
FIG. 2 is an illustration showing configuration aspects of the system shown in FIG.

FIG. 2 illustrates configuration aspects 100 of the host computer 12 for processing an image file 102 to transmit laser printer scan data using the USB standard isochronous mode. The image file 102 may originate from a word processing, spreadsheet, imaging, or other application at the host computer 12. Image files 102 include, for example, text, graphic, image, and other printable files.

A printer driver 104 at the host computer 12 is configured to receive the image file 102 and prepare it for printing. Examples of image preparation/modification include laser printer color space conversion, half-toning, sharpening, and image compression. These and other image preparation functions may be performed by the printer driver 104 to generate the laser printer scan data.

The printer driver 104 is further configured to divide the laser printer scan data into data packets, such as a first data packet 108 having a first set of laser printer scan data and a second data packet 110 having a second set of laser printer scan data, and derive one parity packet 112 for every two packets of data. In one version, the parity packet 112 is derived by applying an XOR operation to the first data packet 108 and the second data packet 110. Note that the first data packet 108 may be reconstructed by applying the XOR operation to the parity packet 112 and the second (corresponding) data packet 110, and the second data packet 110 may be reconstructed by applying the XOR operation to the parity packet 112 and the first (corresponding) data packet 108.

A parity packet is one of many types of reconstruction packets that may be implemented to correct/reconstruct the first data packet 108 or the second data packet 110. For example, error-correcting code may be used to obtain reconstruction packets.

The printer driver 104 is further configured to configure the USB host port 14 to derive error detection data. Error detection data may be derived by applying each data (and parity) packet to a hash function. In one version, the hash function provides a cyclic redundancy check (CRC) checksum value for each data packet. Other techniques that provide error detection data may be implemented.

In operation, the USB host port 14 transmits an isochronous data stream 120 that includes a first data packet and its CRC checksum value ($CRC1_1$) 114, a second data packet and its CRC checksum value ($CRC2_1$) 116, and the parity packet 112 and its checksum value (not shown). The first and second data packets have the first and second sets of laser printer scan data, respectively, for use by the laser printer's video hardware 30. The CRC checksum values can be transmitted to the laser printer 18 as first CRC checksum values ($CRC1_1$ and $CRC2_1$) for each data packet. At the laser printer 18, second CRC checksum values ($CRC1_2$ and $CRC2_2$) may be derived from first and second received sets of laser printer scan data for the first and second received data packets, respectively. A discrepancy between a first CRC checksum value (e.g., $CRC1_1$) and a second CRC checksum value (e.g., $CRC1_2$) for a data packet indicates that an error arose in the data packet during transmission. If a received data packet has an error, it can be reconstructed by applying the XOR operation to the parity packet 112 and the corresponding data packet. It is noted that each parity packet may also have an associated CRC checksum value.

Although the parity packet 112 increases by fifty-percent the amount of data that is transferred when sending laser printer scan data, it provides an immediate resource for reconstructing a data packet at the laser printer 18. It should now be appreciated that, using this technique, the laser printer 18 may be configured to buffer only the data required to reconstruct a data packet, yet provide to the video hardware 30 a continuous and uninterrupted stream of data.

Figure 3:
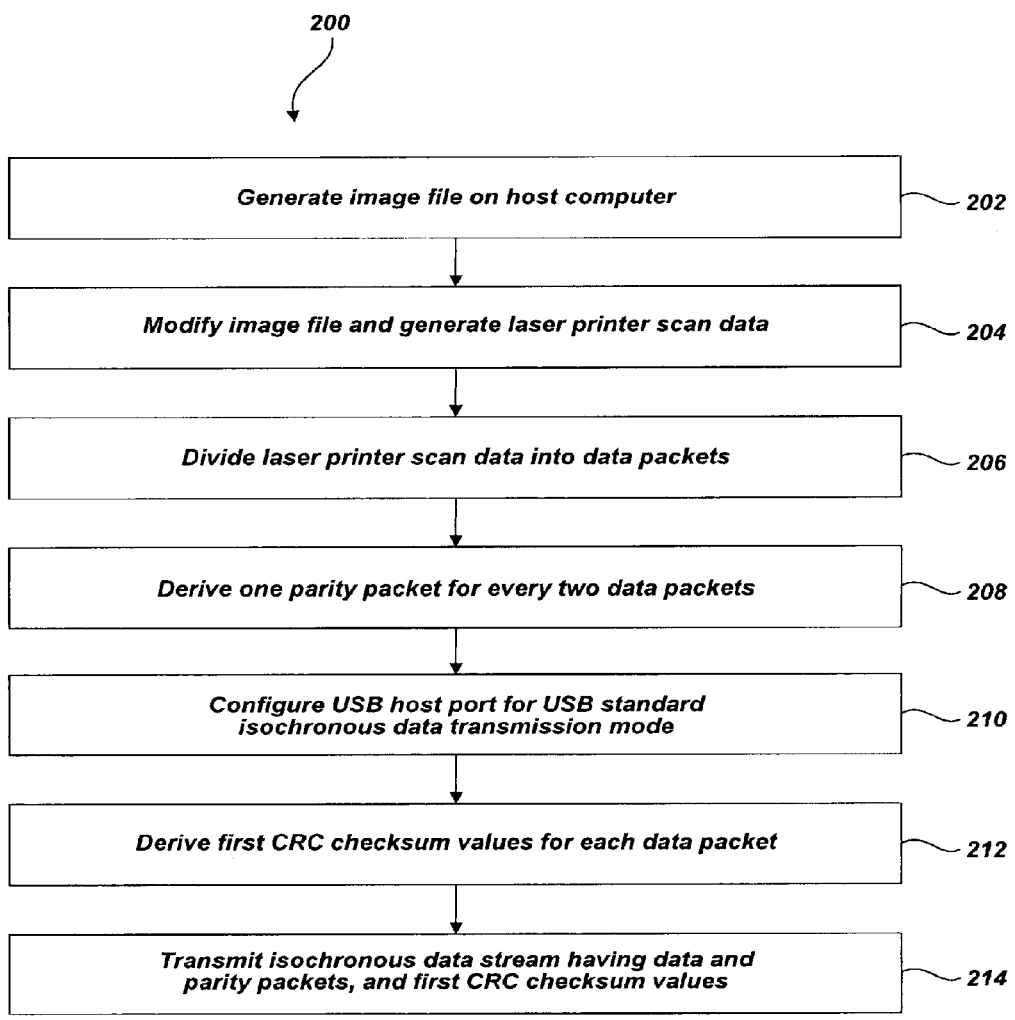
FIG. 3 is a flow chart showing acts of a preferred method for transmitting laser printer scan data using the USB standard isochronous mode.

FIG. 3 shows acts 200 that a host computer 12 may perform to transmit a data stream of laser printer scan data for use by a color laser printer. In one version, the acts are executed by the host processor according to instructions stored on a computer readable storage medium.

At 202 an image file is generated on the host computer 12. At 204 the image file is modified and laser printer scan data is generated. At 206 the laser printer scan data is divided into data packets. In one version, the laser printer scan data is divided into color packets according to the CMYK (cyan, magenta, yellow, and black) color scheme and organized in CMYK order. For example, a first set of laser printer scan data may comprise packets $C_1$, $M_1$, $Y_1$, and $K_1$ and a second set of laser printer scan data may comprise packets $C_2$, $M_2$, $Y_2$, and $K_2$.

At 208 one parity packet, or other type of reconstruction packet, is derived for every two data packets. In the CMYK color scheme, one parity packet may be derived for each color, resulting in four parity packets for every eight data packets. For example, applying the XOR operation to data packets $C_1$ and $C_2$ provides a first cyan parity packet $C_P$. Likewise, a parity packet may be derived for $M_1$ and $M_2$ ($M_P$), $Y_1$ and $Y_2$ ($Y_P$), and $K_1$ and $K_2$ ($K_P$).

At 210 the USB host port 14 is configured for transmitting in USB standard isochronous mode. At 212 a first CRC checksum value is derived for each data packet $C_1$, $M_1$, $Y_1$, $K_1$, $C_2$, $M_2$, $Y_2$, and $K_2$, providing CRC-$C_1$, CRC-$M_1$, CRC-$Y_1$, CRC-$K_1$, CRC-$C_2$, CRC-$M_2$, CRC-$Y_2$, and CRC-$K_2$. Act 212 may be performed automatically as part of standard USB hardware operation. At 214, the USB host port 14 transmits an isochronous data stream having each data packet, the corresponding CRC checksum values, and the four parity packets $C_P$, $M_P$, $Y_P$, and $K_P$ (and corresponding parity packet CRC checksum values).

Referring again to FIGS. 1 and 2, a laser printer 18 is configured to receive from a host computer 12 a USB standard isochronous data stream of laser printer scan data. The laser printer 18 includes an application-specific-integrated-circuit (ASIC) 32 having a processor 26, a laser printer main memory 28, and USB device hardware 22. The laser printer 18 also includes video hardware 30 that may or may not be included in the ASIC 32.

The processor 26 is configured to configure the USB device hardware 22 to receive a data stream, such as data stream 120, that includes a first data packet and its first CRC checksum value ($CRC1_1$) 114, a second data packet and its first CRC checksum value ($CRC2_1$) 116, and a parity packet 112 and its CRC checksum value (not shown). The USB device hardware 22 is further configured to determine whether a received data packet has an error by first deriving second CRC checksum values ($CRC1_2$ and $CRC2_2$) for each received data packet. The USB device hardware 22 then compares the second CRC checksum values ($CRC1_2$ and $CRC2_2$) for each data packet to the first CRC checksum values ($CRC1_1$, $CRC2_1$). If the first and second CRC checksum values are equal for a data packet (e.g., $CRC1_1$=$CRC1_2$), the data packet is communicated to a buffer memory, such as a page buffer, which may be located in the USB device local memory 34, the laser printer main memory 28, the video hardware 30 memory, or other memory that may be in communication with the video hardware 30. If the CRC checksum values are not equal (e.g., $CRC1_1 \neq CRC1_2$), the USB device hardware 22 provides an error signal, such as a transfer descriptor or interrupt, indicating that the laser printer scan data contained in the data packet must be reconstructed.

In one version, firmware running at the processor 26 is configured to monitor the USB device hardware 22 and data packets as they arrive and respond to an error signal from the USB device hardware 22 by reconstructing the data packet having the error. If, for example, $CRC1_1 \neq CRC1_2$, the firmware may request the corresponding parity packet 112 from the USB device hardware 22 and reconstruct the first data packet 108 by applying an XOR operation to the corresponding parity packet 112 and the second data packet 110.

In a second version, the video hardware 30 is configured to perform the functions discussed for the firmware. This version reduces processing functions for the processor 26 and relieves the laser printer main memory 28 from supporting a buffer memory.

In another version, the USB device hardware 22 is configured to perform the functions discussed for the firmware.

Figure 4:
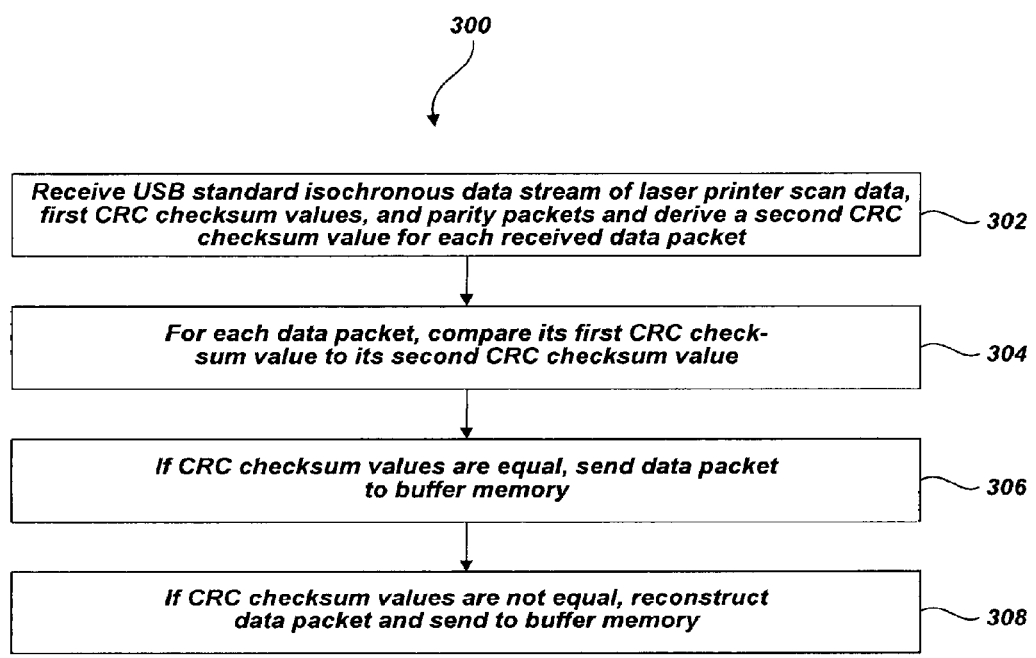
FIG. 4 is a flow chart showing acts of a preferred method for receiving laser printer scan data using the USB standard isochronous mode.

FIG. 4 shows the steps that a laser printer 18 may perform to receive a USB standard isochronous data stream of laser printer color scan data. In one version, the steps are executed by the laser printer according to instructions stored on a computer readable storage medium.

By way of example, the data stream may include two sets of CMYK color scheme data packets $C_1$, $M_1$, $Y_1$, and $K_1$, and $C_2$, $M_2$, $Y_2$, and $K_2$, a first CRC checksum value for each data packet ($CRC\text{-}C1_1$, $CRC\text{-}M1_1$, $CRC\text{-}Y1_1$, $CRC\text{-}K1_1$, $CRC\text{-}C2_1$, $CRC\text{-}M2_1$, $CRC\text{-}Y2_1$, and $CRC\text{-}K2_1$) and four parity packets, $C_P$, $M_P$, $Y_P$, and $K_P$ derived by applying an XOR operation to the data packets of the same color. The data stream may also include CRC checksum values for each parity packet.

At 302 the USB device hardware 22 receives the USB standard isochronous data stream and derives second CRC checksum values ($CRC\text{-}C1_2$, $CRC\text{-}M1_2$, $CRC\text{-}Y1_2$, $CRC\text{-}K1_2$, $CRC\text{-}C2_2$, $CRC\text{-}M2_2$, $CRC\text{-}Y2_2$, and $CRC\text{-}K2_2$) for each received data packet. At 304 the first CRC checksum value is compared to the second CRC checksum value for each packet. If, at 306, the first CRC checksum value is equal to the second CRC checksum value (e.g., $CRC\text{-}C1_1 = CRC\text{-}C1_2$), the data packet ($C_1$) is communicated to a buffer memory. At 308, if the first CRC checksum value is not equal to the second CRC checksum value ($CRC\text{-}C1_1 \neq CRC\text{-}C1_2$), the data packet ($C_1$) is reconstructed by applying an XOR operation to its corresponding parity packet ($C_P$) and corresponding data packet ($C_2$). The reconstructed data packet may then be communicated to a buffer memory for consumption by the video hardware.

It is intended that the foregoing detailed description be understood as an illustration of selected forms that the invention can take and not as a definition of the invention. It is only the following claims, including all equivalents, that are intended to define the scope of this invention.

What is claimed is:

1. A method, comprising:
    deriving a reconstruction packet for a first data packet having a first set of image data and a second data packet having a second set of image data; and
    transmitting from a universal serial bus (USB) host port at a host computer a data stream comprising the first data packet, the second data packet, and the reconstruction packet.

2. The method of claim 1, wherein deriving the reconstruction packet comprises applying an exclusive- or (XOR) operation to the first data packet and the second data packet.

3. The method of claim 1, further comprising:
    deriving a checksum value by applying the first data packet to a hash function, wherein the data stream includes the checksum value.

4. The method of claim 3, wherein the checksum value is a first checksum value, the method further comprising:

deriving, at a USB device hardware in a laser printer, a second checksum value by applying a first received set of image data of the first data packet to the hash function; and
    comparing the first checksum value to the second checksum value.

5. The method of claim 4, further comprising:
    reconstructing the first data packet when the first checksum value does not equal the second checksum value; and
    communicating the reconstructed first data packet and the second data packet to a laser printer main memory.

6. The method of claim 1, wherein the image data is prepared from an image file using an image processing.

7. The method of claim 6, wherein the image processing is selected from a group consisting of laser printer space conversion, half-toning, sharpening, or image compression.

8. The method of claim 1, wherein the image data is printer data.

9. A method, comprising:
    receiving at a USB device hardware a data stream having a first data packet having a first set of image data, a second data packet having a second set of image data, and a first checksum value of the first data packet;
    deriving a second checksum value of the first data packet by applying the first data packet to a hash function; and
    comparing the first checksum value to the second checksum value.

10. The method of claim 9, further comprising:
    reconstructing the first data packet by applying a reconstruction packet to the second data packet when the first checksum value does not equal the second checksum value; and
    communicating a reconstructed first data packet to a laser printer main memory when the first checksum value does not equal the second checksum value.

11. The method of claim 9, further comprising communicating the first data packet and the second data packet to a universal serial bus (USB) device local memory.

12. The method of claim 11, further comprising reconstructing in the USB device local memory the first data packet by applying an exclusive- or (XOR) operation to a parity packet and the second data packet when the first checksum value does not equal the second checksum value.

13. The method of claim 9, further comprising:
    preparing the first set of image data and the second set of image data from an image file by utilizing an image processing technique, wherein the image processing technique is selected from a group consisting of laser printer space conversion, half-toning, sharpening, or image compression.

14. The method of claim 9, wherein the image data is printer data.

15. An apparatus comprising:
    a USB host port; and
    a host processor configured to derive a reconstruction packet based upon a first data packet having a first set of image data and a second data packet having a second set of image data and configured to transmit a data stream, via the USB host port, wherein the data stream comprises the first data packet, the second data packet, and the reconstruction packet for transmission to a laser printer.

16. The apparatus of claim 15, wherein the host processor derives the reconstruction packet by applying an exclusive- or (XOR) operation to the first data packet and the second data packet.

17. The apparatus of claim 15, further comprising a USB device hardware in the laser printer, wherein the host processor is further configured to configure the USB host port to derive a first checksum value by applying the first data packet to a hash function, and include the first checksum value in the data stream, wherein the USB host port is connected to a USB cable and the USB device hardware in the laser printer is connected to the USB cable, wherein the USB device hardware is configured to derive a second checksum value by applying a first received set of image data of the first data packet to the hash function and compare the first checksum value to the second checksum value.

18. The apparatus of claim 15, wherein the host processor is configured to perform image processing on an image file to prepare the image data.

19. The apparatus of claim 18, wherein the image processing is selected from a group consisting of laser printer space conversion, half-toning, sharpening, or image compression.

20. The apparatus of claim 15, wherein the image data is printer data.

* * * * *